United States Patent [19]

Adachi

[11] Patent Number: 5,151,795
[45] Date of Patent: Sep. 29, 1992

[54] METHOD FOR COMPRESSING AND EXTENDING IMAGE SIGNALS

[75] Inventor: Yuuma Adachi, Kanagawa, Japan

[73] Assignee: Fuji Photo Film Co., Ltd., Kanagawa, Japan

[21] Appl. No.: 564,823

[22] Filed: Sep. 9, 1990

[30] Foreign Application Priority Data

Aug. 11, 1989 [JP] Japan .................................. 1-208754

[51] Int. Cl.⁵ .............................................. H04N 1/40
[52] U.S. Cl. ............................................... 358/448; 382/6
[58] Field of Search ............... 358/261.1, 261.2, 261.3, 358/261.4, 262.1, 262.2, 426, 430, 432, 448, 111, 230.27, 110, 133, 138; 250/486.1; 382/56, 6; 378/174, 19, 23; 364/413.13, 413.19, 413.23

[56] References Cited

U.S. PATENT DOCUMENTS

| | | | |
|---|---|---|---|
| 4,558,462 | 12/1985 | Horiba et al. ........................ | 382/43 |
| 4,581,535 | 4/1986 | Komaki et al. .................. | 250/327.2 |
| 4,590,517 | 5/1986 | Kato et al. .......................... | 358/111 |
| 4,710,875 | 12/1987 | Nakajima et al. . | |
| 4,797,944 | 1/1989 | Tanaka ................................ | 382/56 |
| 4,805,030 | 2/1989 | Tanaka ................................ | 382/56 |
| 4,807,042 | 2/1989 | Tanaka ................................ | 364/725 |
| 5,048,110 | 9/1991 | Nakajima ............................ | 382/6 |

FOREIGN PATENT DOCUMENTS

| | | |
|---|---|---|
| 62-172883 | 7/1987 | Japan . |
| 62-172884 | 7/1987 | Japan . |
| 62-172885 | 7/1987 | Japan . |
| 62-172886 | 7/1987 | Japan . |
| 62-247626 | 10/1987 | Japan . |

*Primary Examiner*—Edward L. Coles, Sr.
*Assistant Examiner*—Jerome Grant
*Attorney, Agent, or Firm*—Sughrue, Mion, Zinn, Macpeak & Seas

[57] ABSTRACT

A method for compressing and extending image signals, which represent a plurality of images obtained by the recording of a set of images wherein the images of a single object are recorded simultaneously or sequentially, comprises the steps of carrying out inter-image operation processing on the image signals representing the plurality of the images, and carrying out signal compression processing on image signals, which have been obtained from the inter-image operation processing. In the course of reproducing the images, signal extension processing is carried out on image signals, which have been obtained from the signal compression processing. Reversed inter-image operation processing, which corresponds to the reversed operation of the inter-image operation processing, is then carried out on image signals, which have been obtained from the signal extension processing. Image signals corresponding to the images are thereby obtained.

12 Claims, 4 Drawing Sheets

METHOD FOR COMPRESSING AND EXTENDING IMAGE SIGNALS

BACKGROUND OF THE INVENTION

1. Field of the Invention

This invention relates to a method for compressing and extending image signals wherein digital image signals are compressed when they are to be stored on a storage medium, such as an optical disk, or when they are to be transmitted between image signal processing apparatuses, and wherein the compressed image signals are then extended.

2. Description of the Prior Art

In general, digital image signals are composed of enormous amounts of information. Therefore, in general, before the digital image signals are stored on a storage medium or are transmitted between image signal processing apparatuses, they are compressed. As disclosed in, for example, U.S. Pat. Nos. 4,797,944, 4,805,030 and 4,807,042, and Japanese Unexamined Patent Publication Nos. 59(1984)-22845, 62(1987)-172883, 62(1987)-172884, 62(1987)-172885, 62(1987)-172886 and 62(1987)-247626, a prediction encoding process, an encoding process by orthogonal transformation, a vector quantization process, and the like, have been proposed as the processes for compressing and extending digital image signals. In the disclosed processes, redundancy of the image signals is restricted by the utilization of the characteristics that the image signal components representing the neighboring picture elements of a single image have a high correlation to each other.

When the image signals are stored on a storage medium or are transmitted between image signal processing apparatuses, the signal compressibility should preferably be as high as possible so that the required storage capacity can be reduced and the signal transmission rate can be kept high. However, in order for a high compressibility to be achieved, it is inevitable that an irreversible compression process be employed, with which the original image signal and a reconstructed image signal obtained from the compression of the original image signal and the extension of the compressed image signal are not identical with each other. In such cases, the image quality of an image reproduced from the reconstructed image signal becomes lower as the compressibility is increased. Therefore, the compressibility must be restricted such that the image quality of the reproduced image does not much deteriorate.

During the recording of images, operations for recording a set of images of a single object are often carried out. One type of the recording of a set of images is the angiography, with which several images of a single object injected with contrast media are recorded at short time intervals. The angiography is disclosed in, for example, U.S. Pat. No. 4,590,517. Another type of the recording of a set of images is the recording of contrasted images of the urinary channel of the renal pelvis, with which the contrasted images are recorded at long time intervals ranging from 10 to 20 minutes. A further type of the recording of a set of images is the simultaneous multilayer tomography, as disclosed in, for example, U.S. Pat. No. 4,581,535, with which several tomographic images of a single object are recorded simultaneously. A still further type of the recording of a set of images is the recording of images to be subjected to energy subtraction processing, as disclosed in, for example, U.S. Pat. No. 4,590,517.

SUMMARY OF THE INVENTION

The primary object of the present invention is to provide a method for compressing and extending image signals, wherein the image signals representing the images, which have been obtained by the recording of a set of images, are compressed at a high compressibility.

Another object of the present invention is to provide a method for compressing and extending image signals, wherein the image signals representing the images, which have been obtained by the recording of a set of images, are compressed at a high compressibility such that the image quality of the images reproduced from reconstructed image signals, which are obtained from the extension of the compressed image signals, can be kept at a predetermined high level.

The present invention provides a method for compressing and extending image signals, which represent a plurality of images obtained by the recording of a set of images wherein the images of a single object are recorded simultaneously or sequentially, the method for compressing and extending image signals comprising the steps of:

i) carrying out inter-image operation processing on the image signals representing the plurality of said images, ii) carrying out signal compression processing on image signals, which have been obtained from said inter-image operation processing, iii) in the course of reproducing said images, carrying out signal extension processing on image signals, which have been obtained from said signal compression processing, and iv) carrying out reversed inter-image operation processing, which corresponds to the reversed operation of said inter-image operation processing, on image signals, which have been obtained from said signal extension processing, whereby image signals corresponding to said images are obtained.

In the method for compressing and extending image signals in accordance with the present invention, the signal compression and extension processes for the image signals, which represent the plurality of the images obtained by the recording of a set of images, should preferably be set adaptively and independently of signal compression and extension processes carried out on an image signal, which represents an image obtained by the recording of a single image.

The signal compression and extension processes for the image signals, which represent the plurality of the images obtained by the recording of a set of images, may be carried out in various manners. In cases where a prediction encoding process is employed in the signal compression and extension processes for the image signals, which represent the plurality of the images obtained by the recording of a set of images, code tables, which are used during the encoding, should preferably be set for respective types of the recording of a set of images. Also, in the course of carrying out the signal compression and extension processes on the image signals, which have been obtained from the inter-image operation processing, signal compression and extension processes, in which the prediction encoding process is utilized, should preferably be carried out on said image signals by using a code table corresponding to said image signals.

Alternatively, in cases where an encoding process by orthogonal transformation is employed in the signal compression and extension processes for the image signals, which represent the plurality of the images obtained by the recording of a set of images, code length assigning processes, which are carried out after orthogonal transformation, should preferably be set for respective types of the recording of a set of images. Also, in the course of carrying out the signal compression and extension processes on the image signals, which have been obtained from the inter-image operation processing, signal compression and extension processes, in which the encoding process by orthogonal transformation is utilized, should preferably be carried out on said image signals by using a code length assigning process corresponding to said image signals.

The method for compressing and extending image signals in accordance with the present invention is based on the findings that a plurality of images obtained by the recording of a set of images, wherein the images of a single object are recorded simultaneously or sequentially at some time intervals, have a high correlation to one another. With the method for compressing and extending image signals in accordance with the present invention, the digital image signals representing a plurality of images obtained by the recording of a set of images are subjected to the inter-image operation processing, such as addition, subtraction, or calculation of the sum of products. The image signals, which have been obtained from the inter-image operation processing, are then compressed. Therefore, the compressibility of the whole image signals, which represent a plurality of images obtained by the recording of a set of images, can be kept high. In the course of reproducing the images, the compressed image signals are extended, and the extended image signals are subjected to reversed inter-image operation processing, which corresponds to the reversed operation of the inter-image operation processing. Images are then reproduced from the image signals, which have been obtained from the reversed inter-image operation processing.

As described above, in the method for compressing and extending image signals in accordance with the present invention, the signal compression and extension processes employed for the image signals, which represent the plurality of the images obtained by the recording of a set of images, should preferably be set adaptively and independently of signal compression and extension processes carried out on an image signal, which represents an image obtained by the recording of a single image. (The recording of a single image will hereinbelow be referred to as the normal image recording.) In such cases, each time a plurality of images are obtained by the recording of a set of images, the signal compression and extension processes can be employed which are suitable for the inter-image operation processing to be carried out on these image signals. Therefore, the compressibility can be kept high while the image quality of the reproduced images is kept as good as an image reproduced from the image, which is obtained by the normal image recording.

Also, in cases where the prediction encoding process or the encoding process by orthogonal transformation is employed in the signal compression and extension processes for the image signals, which represent the plurality of the images obtained by the recording of a set of images, code tables or the code length assigning processes are set for respective types of the recording of a set of images (e.g. the recording for the temporal (time difference) subtraction processing, the recording for the energy subtraction processing, the angiography, and the simultaneous multilayer tomography). Therefore, the compressibility can be kept high.

DESCRIPTION OF THE PREFERRED EMBODIMENTS

The present invention will hereinbelow be described in further detail with reference to the accompanying drawings.

Figure 1:
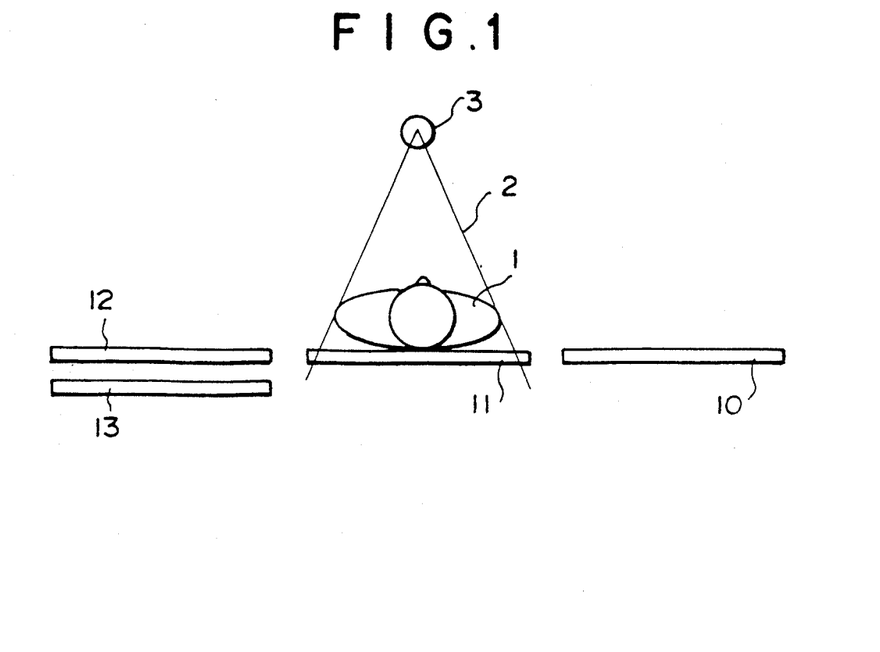
FIG. 1 is a schematic view showing an X-ray image recording apparatus.

FIG. 1 schematically shows an X-ray image recording apparatus. In this example, angiographic operations are carried out with stimulable phosphor sheets.

When certain kinds of phosphors are exposed to radiation, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor. A sheet provided with a layer of the stimulable phosphor is herein referred to as a stimulable phosphor sheet.

Stimulable phosphor sheets 10, 11, 12, and 13 are located one after another at the image recording position facing an X-ray source 3. The X-ray source 3 produces X-rays 2, which pass through an object 1 and then impinge upon the stimulable phosphor sheet located at the image recording position. In this manner, X-ray images of the same object 1 are stored on the stimulable phosphor sheets 10, 11, 12, and 13. During the recording of the X-ray images, an X-ray image of the object 1 is recorded on the stimulable phosphor sheet 10 before a specific blood vessel of the object 1 is injected with contrast media, and X-ray images are recorded on the stimulable phosphor sheets 11, 12, and 13 sequentially at short time intervals after the specific blood vessel of the object 1 has been injected with contrast media.

Figure 2:
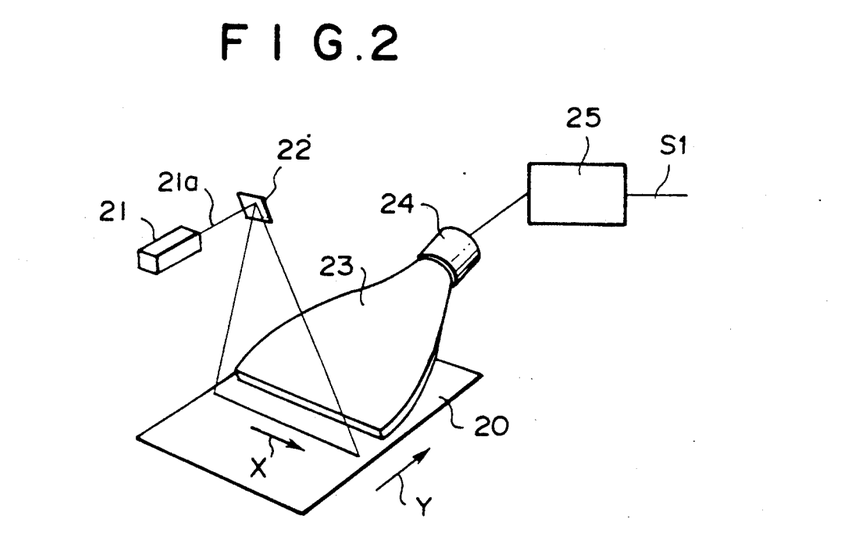
FIG. 2 is a schematic view showing an image readout apparatus, with which a radiation image is read out from a stimulable phosphor sheet carrying the radiation image stored thereon.

FIG. 2 schematically shows an example of an image read-out apparatus.

With reference to FIG. 2, a stimulable phosphor sheet 20, on which an X-ray image has been stored in the manner described above, is conveyed by a conveyance means (not shown) in the direction indicated by the arrow Y. At the same time, a laser beam source 21 produces a laser beam 21a. The laser beam 21a is deflected by a mechanical deflector 22 and is caused to scan the stimulable phosphor sheet 20 in the direction indicated by the arrow X, which direction is approximately normal to the direction indicated by the arrow Y. When the stimulable phosphor sheet 20 is exposed to the laser beam 21a, the exposed portion of the stimulable phosphor sheet 20 emits light in proportion to the amount of energy stored thereon during its exposure to the X-rays 2. The emitted light is guided by a light guide member 23 and photoelectrically detected by a photomultiplier 24, which generates an electric signal. The electric signal generated by the photomultiplier 24 is fed into an A/D converter 25, which converts the electric signal into a digital image signal S1. The image read-out operation described above is carried out on a plurality of the stimulable phosphor sheets, on which a set of angiographic images have been recorded by the X-ray image recording apparatus shown in FIG. 1.

Figure 3:
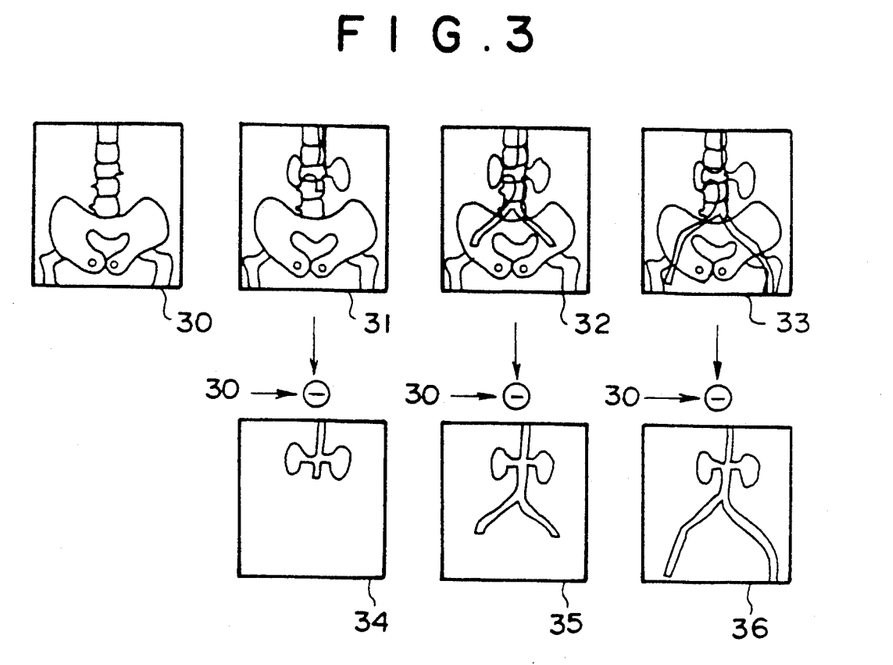
FIG. 3 is an explanatory view showing how temporal subtraction images are formed from the temporal subtraction processing on the image signals representing the angiographic images.

FIG. 3 is an explanatory view showing how temporal subtraction images are formed from the temporal subtraction processing on the image signals representing the angiographic images.

With reference to FIG. 3, a set of angiographic images 30, 31, 32, and 33 are obtained in the manner described above. The image 30 is a masked image, which was recorded before a specific blood vessel of the object 1 is injected with contrast media. The images 31, 32, and 33 are live images, which were recorded after the specific blood vessel of the object 1 has been injected with contrast media. Images 34, 35, and 36 are subtraction images (i.e. images of the blood vessel), which are obtained respectively from subtraction processing on the digital image signals representing the masked image 30 and the live image 31, subtraction processing on the digital image signals representing the masked image 30 and the live image 32, and subtraction processing on the digital image signals representing the masked image 30 and the live image 33. As disclosed in, for example, U.S. Pat. Nos. 4,590,517 and 4,710,875, the subtraction processing operation comprises a position adjusting process, with which a deviation in position between the masked image and the live image is eliminated, the subtraction of the image signal components of the masked image signal and the live image signal from each other which represent corresponding picture elements in the masked image and the live image, an automatic image density correcting process carried out after the subtraction, and the like. The position adjusting process may be carried out adaptively such that an image is divided into a plurality of blocks, and errors in image signal components are minimized for each of the blocks.

Figure 4A:
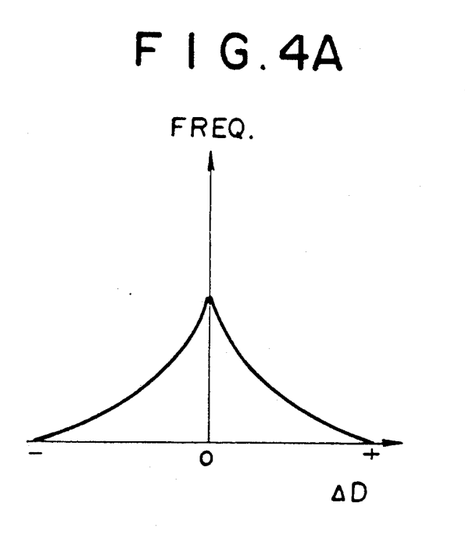
FIG. 4A is a graph showing an example of a probability density function of predicted difference values between the values of image signal components representing adjacent picture elements of an image, which is obtained by the normal image recording and which may be a masked image or a live image.
Figure 4B:
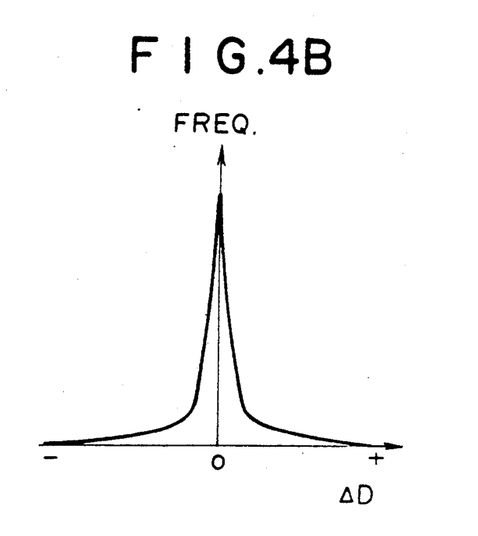
FIG. 4B is a graph showing an example of a probability density function of predicted difference values between the values of image signal components representing adjacent picture elements of a subtraction image, which is obtained from subtraction processing.

FIG. 4A is a graph showing an example of a probability density function of predicted difference values $\Delta D$ between the values of image signal components representing adjacent picture elements of an image, which is obtained by the normal image recording and which may be a masked image or a live image. FIG. 4B is a graph showing an example of a probability density function of predicted difference values $\Delta D$ between the values of image signal components representing adjacent picture elements of a subtraction image, which is obtained from subtraction processing.

In the case of a subtraction image, the image signal components representing the background region, which occupies a comparatively large area of the image, take approximately identical values. Therefore, as shown in FIG. 4B, the predicted difference values $\Delta D$ between the values of image signal components representing adjacent picture elements of the subtraction image concentrate at 0 to a higher extent than in FIG. 4A. Also, the number of the predicted difference values $\Delta D$ having small absolute values is smaller than in FIG. 4A. Stated differently, an image signal representing a subtraction image includes few low-frequency components, except for the d.c. components. In general, during the encoding process in the compression, a shorter code (comprising a smaller number of bits) is assigned to a value, which occurs more frequently, and a longer code is assigned to a value, which occurs less frequently. Therefore, the compressibility becomes high when the image signal representing a subtraction image is compressed than when the image signal representing a live image is compressed. Accordingly, during the compression of image signals representing the angiographic images, the image signal representing the masked image is compressed in the same manner as that for the image signal representing an image, which is obtained by the normal image recording. The image signals representing the live images are not compressed, but the image signals representing the subtraction images, which are obtained from subtraction processing on the image signals representing the live images and the masked image, are compressed. The compressed image signals are then stored on a storage medium, such as an optical disk, or are transmitted between image signal processing apparatuses. In this manner, the compressibility of the whole set of the image signals can be kept higher than when the image signals representing the masked image and the live images are compressed respectively.

The compressed image signals, which have been obtained from the compression of a set of image signals representing the masked image and the temporal subtraction images, are then extended. The masked image and a plurality of subtraction images can be reproduced from the extended image signals. Thereafter, the image signal components of the extended image signals which represent the corresponding picture elements in each subtraction image and the masked image are added to each other. In this manner, the live images can be reproduced from the resulting image signals.

Figure 5:
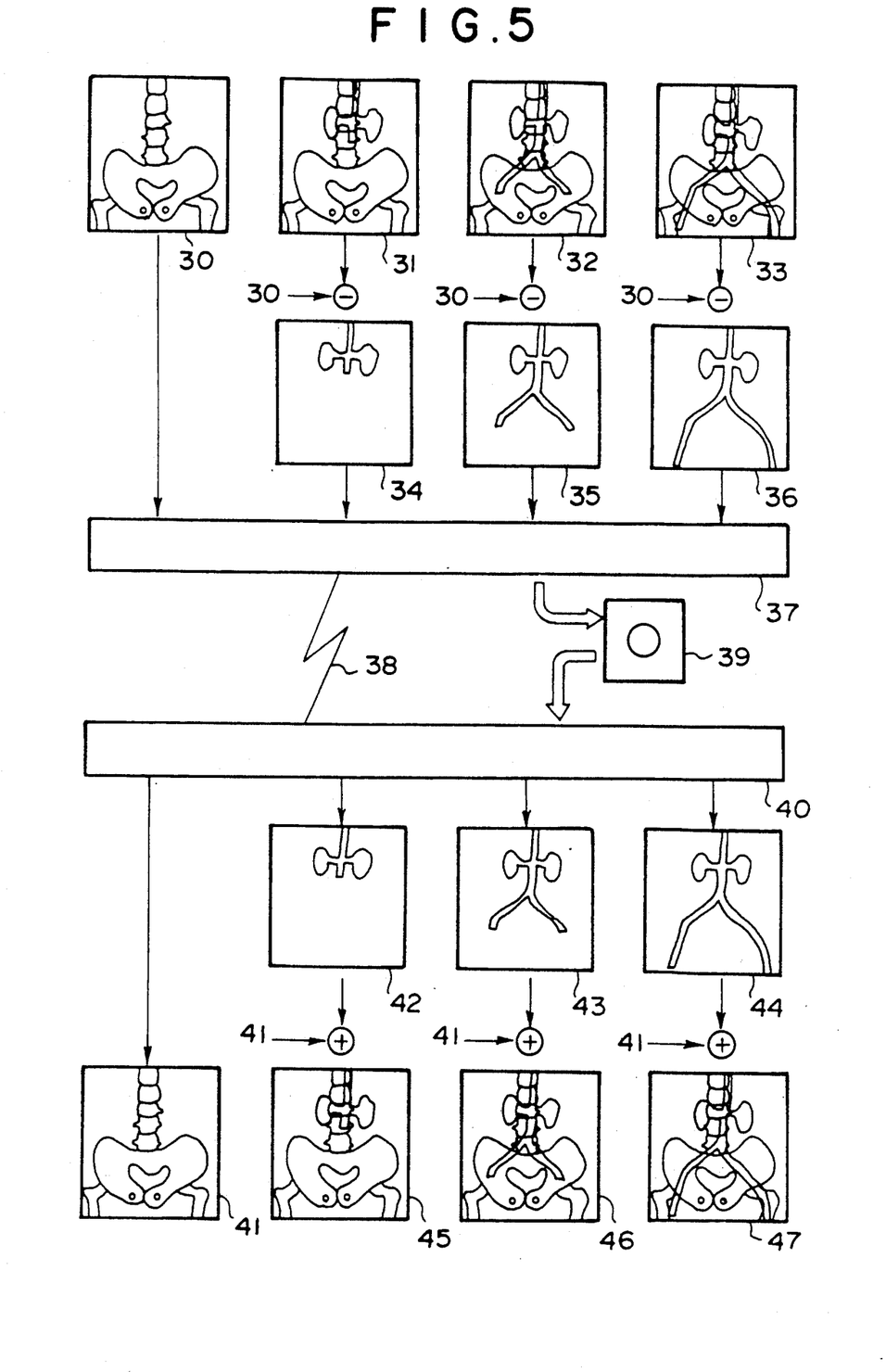
FIG. 5 is an explanatory view showing how the image signals representing a masked image and live images (angiographic images) are compressed and extended with the method for compressing and extending image signals in accordance with the present invention.

FIG. 5 is an explanatory view showing how the image signals representing a masked image and live images (angiographic images) are compressed and extended with the method for compressing and extending image signals in accordance with the present invention.

With reference to FIG. 5, the image signal representing the masked image 30 is fed into a compressor 37. Also, the image signals representing the subtraction images 34, 35, and 36, which have been obtained by carrying out subtraction processing on the image signals representing the masked image 30 and the live images 31, 32, and 33 in the manner described above, are fed into the compressor 37. The image signals representing the masked image 30 and the subtraction images 34, 35, and 36 are compressed. The compressed image signals are fed through a transmission line 38 into an extender 40. Alternatively, they are stored on a storage medium 39 and are then fed into the extender 40. From the extended image signals, a masked image 41 and subtraction images 42, 43, and 44 are reproduced. (In some cases, the image quality of the reproduced images will deteriorate slightly due to the compression processes.)

Thereafter, the image signals representing the masked image 41 and each of the subtraction images 42, 43, and 44 are subjected to addition processing. i.e. the reversed inter-image operation processing, which corresponds to the reversed operation of the inter-image operation processing (subtraction processing) carried out during the compression. In this manner, image signals representing live images 45, 46, and 47 are obtained. In cases where the live images 45, 46, and 47 need not be reproduced, the image signals representing the masked image 41 and each of the subtraction images 42, 43, and 44 need not be added together. Alternatively, only the image signal representing a live image, which is to be reproduced, may be obtained by adding the image signals representing the masked image 41 and the corresponding subtraction image.

As described above, in the case of the angiography, instead of the image signals representing the masked image and the live images being compressed, the image signals representing the masked image and the subtraction images are compressed. The compressed image signals are stored on a storage medium or transmitted between image signal processing apparatuses. The compressed image signals are then extended. The extended image signals representing the masked image and each subtraction image are then added together. In this manner, image signals representing the live images are reconstructed. Therefore, the compressibility can be kept high.

In cases where image signals representing contrasted images of the urinary channel of the renal pelvis are to be compressed and extended, the position adjustment and the subtraction are carried out on the image signal representing the image of the urinary channel injected with no contrast media and the image signals representing the images of the urinary channel injected with contrast media. The image signals representing the subtraction images, which are obtained from subtraction processing, are then compressed and extended. In this manner, the compressibility of a set of image signals representing the contrasted images of the urinary channel of the renal pelvis can be kept high.

How the image signals representing the energy subtraction images are compressed will be described hereinbelow.

As is well known, in energy subtraction processing, the image signals representing a high-energy image, which has been recorded with X-rays having a high energy level, and a low-energy image, which has been recorded with X-rays having a low energy level, are weighted and subtracted from each other. In this manner, image signals representing an image, from which a bone image has been eliminated, and an image, from which a soft tissue image has been eliminated, can be obtained. In such cases, instead of the image signals representing the high-energy image and the low-energy image being compressed respectively, the image signals representing the image, from which the bone image has been eliminated, and the image, from which the soft tissue image has been eliminated, are compressed. Therefore, the compressibility can be kept higher than when the image signals representing the high-energy image and the low-energy image are compressed. During the signal extension, the image signals representing the image, from which the bone image has been eliminated, and the image, from which the soft tissue image has been eliminated, are weighted and added together. In this manner, the image signals representing the high-energy image and the low-energy image can be reconstructed. Weighting factors used during the addition can be calculated from the weighting factors, which were used during the subtraction carried out to obtain the image signals representing the image, from which the bone image has been eliminated, and the image, from which the soft tissue image has been eliminated.

In the embodiments described above, as the inter-image operation processing prior to the signal compression, the subtraction of the image signal components of the image signals which represent corresponding picture elements in the images is carried out during the temporal subtraction processing. Also, as the inter-image operation processing, the weighting and the subtraction of the image signal components of the image signals which represent corresponding picture elements in the images are carried out during the energy subtraction processing. However, the inter-image operation processing prior to the signal compression is not limited to such inter-image operation processing for yielding the desired images, but may be of any operation which is carried out for the purpose of increasing the compressibility. For example, in the cases of image signals representing the images recorded with the simultaneous multilayer tomography, inter-image operation processing may be carried out in the manner described below. Specifically, a small amount of X-rays reach a low tomographic layer, and therefore the granularity of the image of the low tomographic layer is low. Therefore, the compressibility is low for the image signal representing the image of the low tomographic layer. Accordingly, the image signal representing the image of the top tomographic layer is compressed directly. The image signal representing the image of a low tomographic layer and the image signal representing the image of a tomographic layer, which is located adjacent to and above said low tomographic layer, is weighted with weighting factors such that the granularity becomes the minimum, and may then be added together. In this manner, the image signal representing the image of a low tomographic layer may be compressed. After the image signals are extended, the image signal representing the image of each tomographic layer may be reconstructed by carrying out the weighting and subtraction from the image signal representing the image of the top tomographic layer.

Also, independently of the signal compression and extension processes carried out on the image signal, which represents an image obtained by the normal image recording, the signal compression and extension processes can be employed which are suitable for the image signals obtained from the inter-image operation processing. Therefore, the compressibility can be kept high while the image quality of the reproduced images is kept as good as an image reproduced from the image, which is obtained by the normal image recording. The image signal, which represents an image obtained by the normal image recording, may be compressed and extended with the prediction encoding process, which can be carried out with a simple compressor and which causes little distortion to occur. A subtraction image has a large background region, and the dynamic range of the image signal representing the subtraction image is narrow. Therefore, the vector quantization process may be employed during the compression and extension of the image signal representing the subtraction image. With the vector quantization process, the number of vectors defined by a code book can be made small, and the length of the encoded signal representing the vector identification number can be made short. Accordingly, when the vector quantization process is employed, the image signal representing the subtraction image can be compressed markedly while the image quality of the reproduced image is kept as good as an image reproduced from the image, which is obtained by the normal image recording. As a result, the compressibility of the whole set of the image signals representing the angiographic images can be kept high.

Alternatively, the image signals obtained from the inter-image operation processing on the image signals representing the images, which have been obtained by the recording of a set of images, may be compressed and extended with the same signal compression and extension processes as the image signal, which represents the image obtained by the normal image recording. In such cases, different code length assigning processes, different code tables, or different code books should preferably be prepared for the normal image recording and respective types of the recording of a set of images (e.g. the recording for the temporal subtraction processing, and the recording for the energy subtraction processing). In such cases, the hardware cost can be kept low, and the compressibility can be kept high.

For example, as described above, in the cases of temporal subtraction processing of angiographic images, the predicted difference values between the values of image signal components representing adjacent picture elements of the subtraction image concentrate at 0. Therefore, in cases where the prediction encoding process is employed during the compression, a Huffman encoding table (Table 1) for the masked image and the image obtained by the normal image recording and a Huffman encoding table (Table 2) for the subtraction images should preferably be prepared. With the Huffman encoding table for the subtraction images, as short codes as possible are assigned to predicted difference values close to 0. In such cases, the compressibility of the image signals representing the subtraction images can be kept high.

TABLE 1

| Dif. value | Code |
| --- | --- |
| 10 | *001000100 |
| 9 | *001000010 |
| 8 | *00100011 |
| 7 | *0010011 |

TABLE 1-continued

| Dif. value | Code |
| --- | --- |
| 6 | *0000011 |
| 5 | *000111 |
| 4 | *00101 |
| 3 | *00001 |
| 2 | *011 |
| 1 | *111 |
| 0 | *10 |
| −1 | *110 |
| −2 | *010 |
| −3 | *0011 |
| −4 | *00010 |
| −5 | *000110 |
| −6 | *0000010 |
| −7 | *0010010 |
| −8 | *00100000 |
| −9 | *001000011 |
| −10 | *001000101 |
| others | *0000001 |

TABLE 2

| Dif. value | Code |
| --- | --- |
| 7 | *000011000 |
| 6 | *000010110 |
| 5 | *00001101 |
| 4 | *0000111 |
| 3 | *00110 |
| 2 | *0010 |
| 1 | *011 |
| 0 | *1 |
| −1 | *010 |
| −2 | *0001 |
| −3 | *00111 |
| −4 | *0000100 |
| −5 | *00001010 |
| −6 | *000010111 |
| −7 | *000011001 |
| others | *00001 |

Figure 6A:
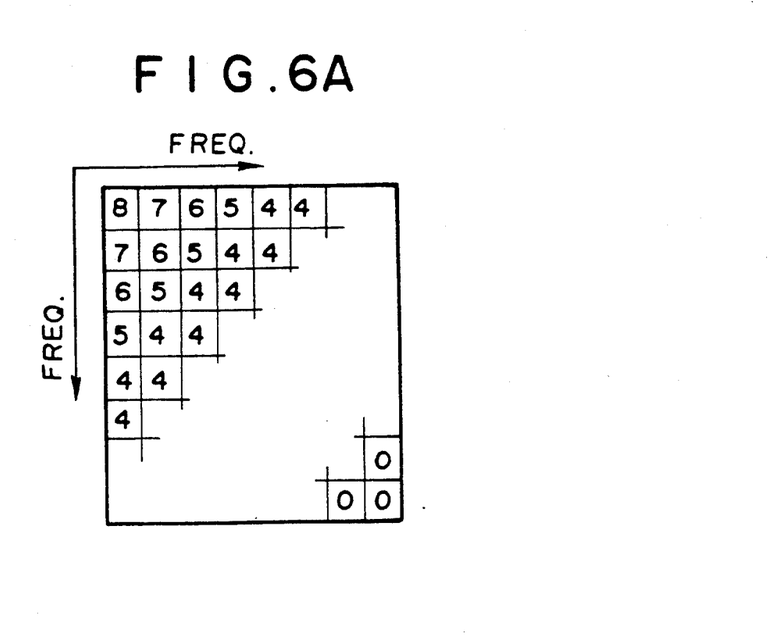
FIG. 6A is an explanatory view showing how code lengths are assigned to transformed image signal components obtained from orthogonal transformation of the image signal components of an image signal representing an image, which is obtained by the normal image recording and which may be a masked image, in an embodiment of the method for compressing and extending image signals in accordance with the present invention.
Figure 6B:
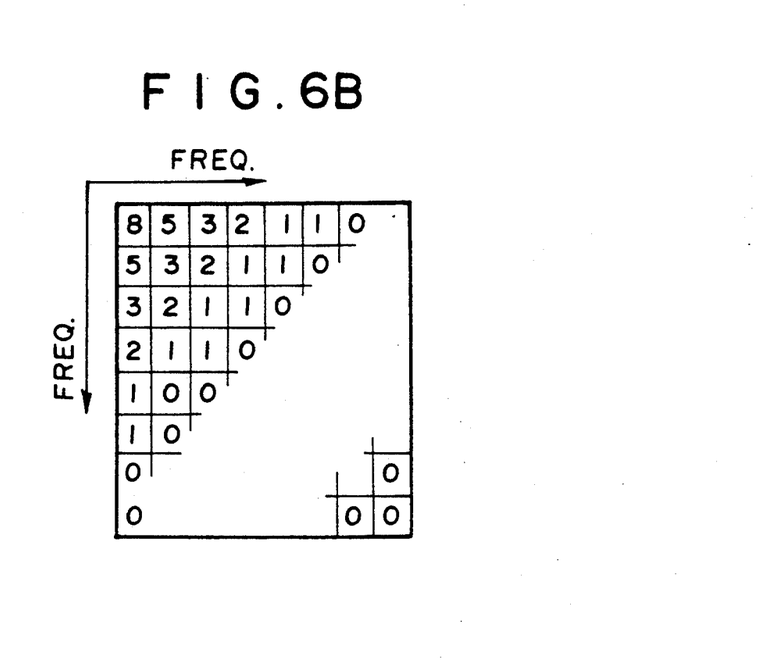
FIG. 6B is an explanatory view showing how code lengths are assigned to transformed image signal components, which are obtained from orthogonal transformation of the image signal components of an image signal representing a subtraction image in the embodiment of the method for compressing and extending image signals in accordance with the present invention.

The image signal representing a subtraction image includes few low-frequency components and concentrates at d.c. components. Therefore, in cases where encoding process by orthogonal transformation is employed, transformed image signal components obtained from orthogonal transformation of the image signal components of an image signal representing a masked image or an image, which is obtained by the normal image recording, may be encoded in accordance with the bit assignment table shown in FIG. 6A. Also, transformed image signal components, which are obtained from orthogonal transformation of the image signal components of an image signal representing a subtraction image, may be encoded in accordance with the bit assignment table shown in FIG. 6B. With the bit assignment table for subtraction images shown in FIG. 6B, a small number of bits is assigned to a low-frequency component. In this manner, the compressibility of the image signals representing the subtraction images can be kept high.

In cases where the vector quantization process is employed, as for the image signals representing the subtraction images, little distortion occurs even when the number of the vectors defined in the code book is small. Therefore, the lengths of the encoded signals representing the vector identification numbers can be made short. Accordingly, when the vector quantization process is employed, the image signals representing the subtraction images can be compressed markedly while the image quality of the reproduced images is kept as good as an image reproduced from the image, which is obtained by the normal image recording.

With any of these quantization processes, the compressibility can be kept high by preparing code tables, bit assignment tables, and code books also for the recording of a set of images, such as the recording for energy subtraction processing and the simultaneous multilayer tomography. Also, for the other compression processes, such as the block encoding processes, the compressibility can be kept high when the encoding processes are prepared for the respective types of the recording of a set of images.

In the aforesaid embodiments of the method for compressing and extending image signals in accordance with the present invention, image signals representing X-ray images obtained by the recording of a set of images are processed. The method for compressing and extending image signals in accordance with the present invention is applicable also when image signals representing a plurality of tomographic images obtained by the X-ray CT technique or the MRI technique and image signals representing the contrasted tomographic images are to be compressed and extended.

We claim:

1. A method for compressing and extending image signals, comprising the steps of:
   i) obtaining a recording of a set of images, which represents a plurality of images, wherein the images of a single object are recorded simultaneously or sequentially,
   ii) carrying out inter-image operation processing on the image signals representing the plurality of said images,
   iii) carrying out signal compression processing on image signals, which have been obtained from said inter-image operation processing,
   iv) in the course of reproducing said images, carrying out signal extension processing on image signals, which have been obtained from said signal compression processing, and
   v) carrying out reversed inter-image operation processing, which corresponds to the reversed operation of said inter-image operation processing, on image signals, which have been obtained from said signal extension processing, whereby image signals corresponding to said images are obtained.

2. The method as defined in claim 1 wherein the signals compression and extension processes for the image signals, which represent the plurality of said images obtained by said recording of a set of images, comprises a sub-set of:
   setting the signal compression and extension processes adaptively and independently of signal compression and extension processes carried out on an image signal, which represents an image obtained by the recording of a single image.

3. The method as defined in claim 1 further comprising:
   setting code tables, which are used during encoding for respective types of the recording of a set of images, and
   subjecting the image signals to signal compression and extension processing using prediction encoding in a course of carrying out the signal compression and extension processes on the image signals, which gave been obtained from said inter-image operation processing.

4. The method as defined in claim 1
   further comprising:
   orthogonal transformation encoding the image signals which have been obtained from said inter-image operation processing, and subjecting the signal compression and extension processes to a code length assigning process subsequent to the orthogonal transformation step.

5. The method as defined in claim 1 wherein said plurality of images includes processing radiation images.

6. The method as defined in claim 5 wherein said radiation images are stored on stimulable phosphor sheets, and each of the image signals representing the radiation images is obtained from a read-out operation in which a stimulable phosphor sheet is exposed to stimulating rays, which cause it to emit light in proportion to an amount of energy stored thereon during its exposure to radiation, and the emitted light is detected photoelectrically.

7. The method as defined in claim 6 wherein said stimulating rays are a laser beam.

8. The method as defined in claim 1 wherein said recording of a set of images is the recording of images for temporal subtraction processing.

9. The method as defined in claim 1 wherein said recording of a set of images is the recording of images for energy subtraction processing.

10. The method as defined in claim 1 wherein said recording of a set of images is an angiography.

11. The method as defined in claim 1 wherein said recording of a set of images is the recording of contrasted images of a urinary channel of a renal pelvis.

12. The method as defined in claim 1 wherein said recording of a set of images is a simultaneous multilayer tomography.

* * * * *